(No Model.)

J. CLEMENTS.
SPEED INDICATING BELL.

No. 586,544. Patented July 20, 1897.

Witnesses.

John Clements, Inventor.
By his Attorneys

UNITED STATES PATENT OFFICE.

JOHN CLEMENTS, OF LONDON, ENGLAND.

SPEED-INDICATING BELL.

SPECIFICATION forming part of Letters Patent No. 586,544, dated July 20, 1897.

Application filed November 13, 1896. Serial No. 612,003. (No model.)

*To all whom it may concern:*

Be it known that I, JOHN CLEMENTS, a subject of the Queen of Great Britain, residing at London, England, have invented a new and useful apparatus applicable to motor carriages, cycles, and other vehicles for automatically signaling when a predetermined speed is attained, of which the following is a specification.

This invention relates to an apparatus for use with motor carriages, cycles, and other vehicles whereby an audible signal is given when the said carriages, cycles, or other vehicles attain a predetermined speed.

According to my invention I provide a bell or bells, gong or gongs, and in connection therewith I arrange a spindle to one end of which is or are pivoted an arm or arms having hammers. In conjunction with the spindle I provide suitable means in connection with one of the rotating axles or hubs of the carriage, cycle, or other vehicle whereby when the said axle or hub rotates the spindle, having upper and lower bearings, is also rotated by gearing at its lower end to cause the arm or arms pivoted to its other end to fly out under the action of centrifugal force, the extent to which the arm or arms can fly increasing with the speed of rotation of the spindle until when the vehicle attains a certain requisite and predetermined speed the said arm or arms will fly out to such an extent that the bell or gong is sounded, so as to indicate to pedestrians and others that the said predetermined limit of speed has been attained by the carriage or vehicle, and thus putting it out of the power of the driver to alter or adjust the mechanism to indicate falsely any other but the proper speed to which it is required to limit the vehicle. Instead of employing pivoted arms at the end of the rotating spindle I may provide the said end with one or more hammers normally kept out of contact with the gong or bell by springs, and which when the spindle rotates flies or fly out under the action of centrifugal force and against that of the spring or springs until a certain speed has been attained, when they come in contact with the bell or gong, so as to sound the same. In practice I find it advantageous to drive the spindle carrying the hammers by means of bevel-gear.

To enable my invention to be fully understood, I will describe the same by reference to the accompanying drawings, in which—

Figure 1:
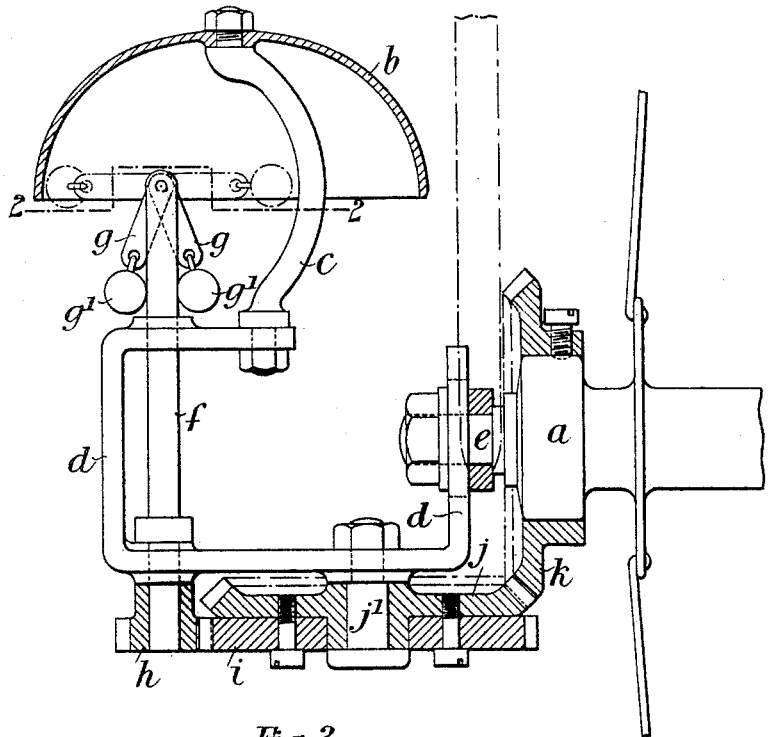
Figure 2:
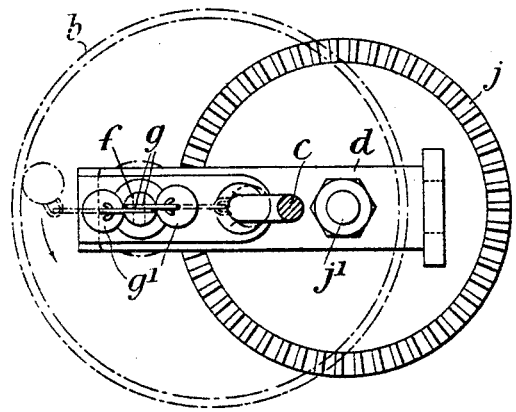
Figure 3:
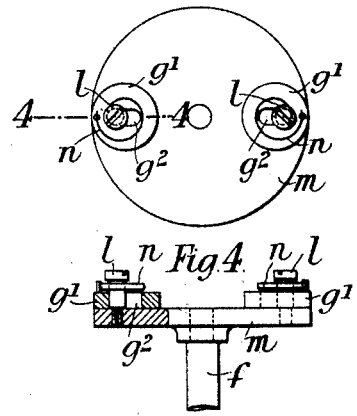
Figure 4:
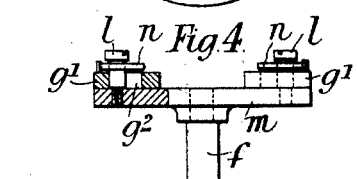

Figure 1 is a sectional elevation of my signaling apparatus applied to the hub of a cycle-wheel and constructed according to my invention. Fig. 2 is a section on the line 2 2, Fig. 1. Fig. 3 is a plan of the modified arrangement of striking or sounding gear; and Fig. 4 is a sectional elevation of the same, the section being taken on the line 4 4, Fig. 3.

Similar letters of reference indicate the same or corresponding parts in the several figures.

$a$ is the hub of the cycle-wheel, to which my apparatus is shown attached.

$b$ is the bell or gong, (only one is shown in the drawings, although I may employ several such gongs or bells,) mounted on an arm $c$, rigidly bolted to a bracket $d$, secured to the axle $e$, on which the hub $a$ rotates.

$f$ is the spindle, the said spindle being mounted in bearings in the bracket $d$, and $g\ g$ are the arms, pivoted to the upper end of the spindle $f$ and provided with swing-hammers $g'\ g'$, hung at their outer ends. The bell $b$ and the spindle $f$ and arms $g\ g$ are so arranged relatively with one another that when the spindle $f$ rotates at a certain predetermined speed the hammers $g'\ g'$ strike against the bell or gong, so as to sound it, as hereinbefore described. To rotate the said spindle $f$, I employ the following arrangement: A pinion $h$ is secured to the lower end of the spindle $f$ and gears with a spur or toothed wheel $i$, fixed to the bevel-wheel $j$, mounted on a stud $j'$, secured to the bracket $d$. The bevel-wheel $j$ gears with a second bevel-wheel $k$, mounted on the hub $a$ of the cycle-wheel.

With this construction of signaling apparatus it will be obvious that when the cycle-wheel rotates the spur and bevel-gear $h\ i\ j\ k$ will rotate the spindle $f$, thereby causing the arms $g\ g$, pivoted to its upper end, to swing outward under the action of centrifugal force. The greater the centrifugal force which acts upon the arms $g\ g$ the greater the extent to which they fly out, so that when a certain speed has been attained by the hub $a$ the arms $g$ will swing outward to such an extent that the hammers $g'$ $g'$ strike against the bell or gong $b$, thus giving an audible indication that the said speed has been attained. By decreasing the speed of the axle the arms $g$ fall out of contact with the bell or gong and the sounding ceases.

Figs. 3 and 4 show the modification wherein the pivoted arms $g$ $g$ and hammers $g'$ $g'$ are replaced by hammers $g'$ $g'$, which are slotted, as shown at $g^2$ $g^2$, to receive studs $l$ $l$, screwed to a disk $m$, attached to the upper end of the spindle $f$. $n$ $n$ are springs, one end of each of which is connected to one of the hammers and the other end to one of the studs $l$ $l$ in such a manner that the said hammers are normally held out of contact with the bell or gong $b$. With this construction it will be obvious that when the spindle $f$ is rotated, as above described, the centrifugal force imparted to the hammers $g'$ $g'$ will gradually, as the speed of the vehicle increases, overcome the inwardly-acting force of the springs $n$ $n$ and will cause the said hammers $g'$ to fly out, so that when the predetermined speed has been attained they will strike against and sound the bell or gong $b$.

Instead of employing bevel-wheels, as above described, it will be obvious that I can operate the spindle $f$ through the medium of any other suitable mechanism actuated by the hub of the cycle or any other rotating part of the vehicle to which the arrangement is to be connected.

It is evident that in cases where my signaling apparatus is employed on vehicles pedestrians are made aware at once if a vehicle is exceeding the speed allowed on public roads, and the person in charge of any vehicle can so control the speed of the same as to keep below the limit of speed allowed.

Having now particularly described and ascertained the nature of my said invention and in what manner the same is to be performed, I declare that what I claim is—

1. In combination with the driving mechanism, a spindle, a spindle-supporting bracket secured on the wheel-hub, an arm secured to the bracket and supporting a gong or bell, arms pivoted on the spindle and adapted when rotated thereby to swing up into the cavity of the bell, and hammers free to swing on the outer ends of these arms, and non-adjustable gearing normally made to cause the hammers to ring the bell only when the requisite or prescribed speed shall have been attained, all substantially as set forth.

2. A sound-signaling apparatus for cycles and other vehicles, having in combination with the hub or rotating axle, a bracket $d$, the spindle mounted in bearings in said bracket, hammer-arms pivoted on said spindle, a bell-supporting arm on said bracket, the pinion on the lower end of the spindle, spur-wheel $i$, and bevel-wheel $j$, secured concentrically thereto, and the bevel-wheel $k$, engaging with wheel $j$, and mounted on the hub of the axle, the combination being and operating substantially as set forth.

3. In a sound-signaling apparatus for cycles or other vehicles, the combination of a bell or gong, a spindle rotatable by gears from a rotating hub or axle, and slotted spring-hammers mounted on a disk on the end of such spindle, and adapted to overcome the force of the spring and by centrifugal action to fly outward to strike the gong or bell when and only when the spindle is rotated at the prescribed and predetermined speed, all as set forth.

JOHN CLEMENTS.

Witnesses:
G. F. REDFERN,
G. F. TYSON.